Figures 1, 2, 3:
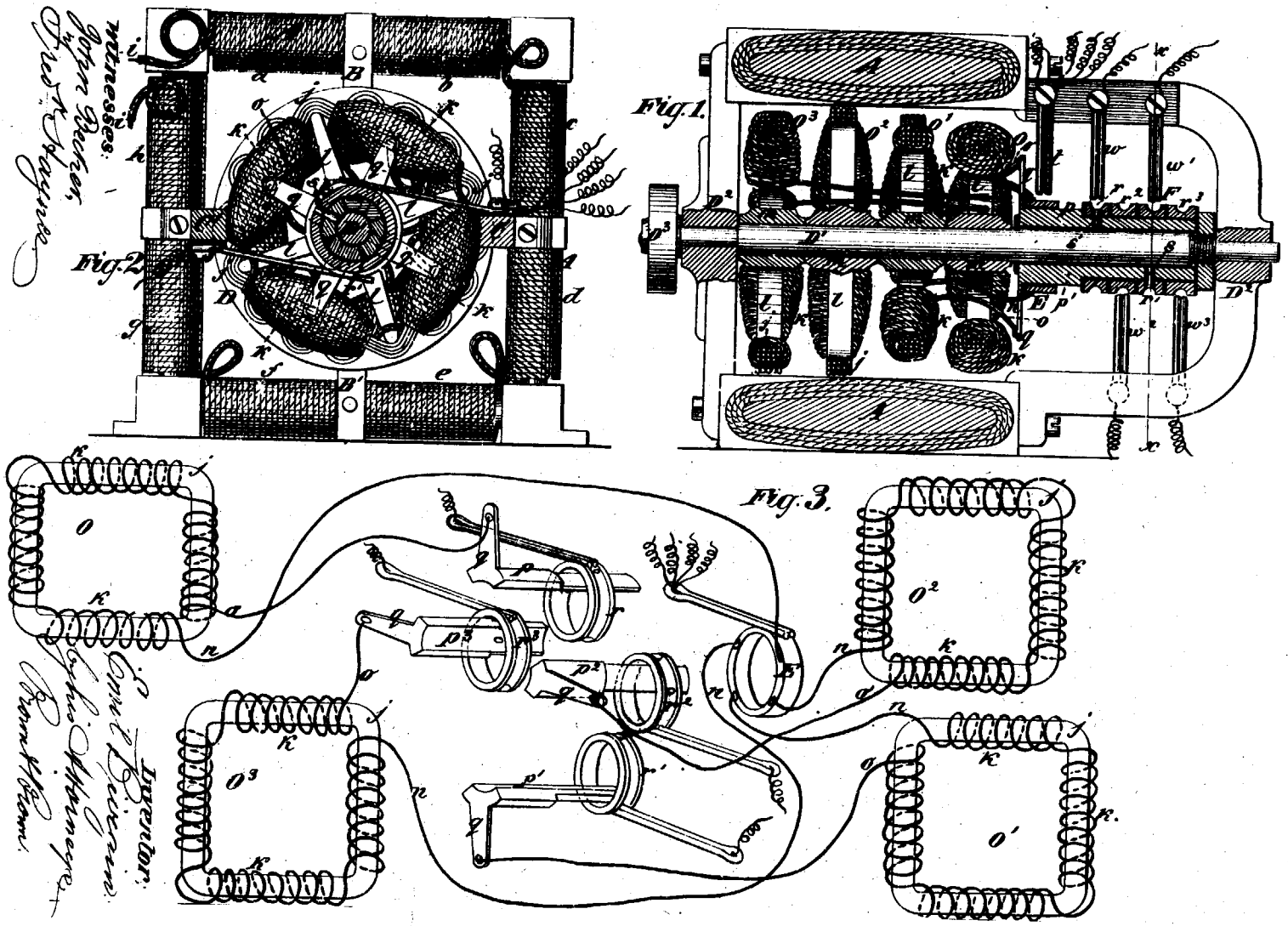

E. BÜRGIN.

Magneto Electric Machine.

No. 9,438. Reissued Nov. 2, 1880.

Witnesses:
John Becker,
Fred K. Haynes

Inventor:
Emil Bürgin
by his Attorneys
Brown & Brown.

UNITED STATES PATENT OFFICE.

EMIL BÜRGIN, OF BASEL, SWITZERLAND.

MAGNETO-ELECTRIC MACHINE.

SPECIFICATION forming part of Reissued Letters Patent No. 9,438, dated November 2, 1880.

Original No. 224,642, dated February 17, 1880. Application for reissue filed July 30, 1880.

*To all whom it may concern:*

Be it known that I, EMIL BÜRGIN, of Basel, in the Republic of Switzerland, have invented certain new and useful Improvements in Magneto-Electric Machines, of which the following is a specification.

The object of my invention is to produce a compact, simple, and effective machine for the production of alternative currents of electricity.

My invention consists in a novel construction of the generating-cylinder, in a novel construction of a commutator, in the combination of said commutator with said cylinder, and in certain details of construction hereinafter to be described.

In the accompanying drawings, Figure 1 represents a longitudinal section of a machine embodying my improvements; Fig. 2, a transverse section on the dotted line *x x*, Fig. 1; and Fig. 3, a perspective view of the several elements composing the generating-cylinder and their connections with the several commutator-rings.

Similar letters of reference designate corresponding parts in all the figures.

A designates the stationary frame of the machine, which may be made of wrought or cast iron. It may be composed of two or several pieces, and is represented as wound with wire, forming coils *a b c d e f g h*, connected with each other so as to form poles B B′ C C′ when an electric current passes through them, and terminating at *i*.

D designates a rotary generating-cylinder, mounted on a central shaft, D′, supported in bearings $D^2$, extending from the frame A. The said shaft is also provided with a pulley, $D^3$, which may receive a belt for rotating the said shaft and generating-cylinder. The generating-cylinder D is represented as composed of a number of separate elements, O $O'$ $O^2$ $O^3$, each consisting of a hub, *m*, with radial arms *l*, and a polygonal core or ring, *j*, which has its sides wound with insulated wire, forming coils *k*, and its angles left bare, so the iron may rotate as near as possible to the poles B B′ C C′, the said hub being fast on the shaft D′, and said arms supporting the polygonal core or ring *j*, as shown in Figs. 1 and 2. The core or ring *j* is preferably made of soft-iron wire, and the arms *l* may be made of any metal other than iron. The core or ring *j* of each element is shown as rectangular, to correspond with the number of poles in the frame A, but it may be made in any polygonal form, as hexagonal or octagonal, the frame A having its poles equal in number to the sides of the said core. The wire of the coils is represented in Fig. 2 as wound in such manner as to as nearly fill out the circular profile or contour of the cylinder as is possible without touching the poles B B′ C C′

In order to make currents of electricity passing from the machine continuous the elements composing the generating-cylinder are set spirally on the shaft, each being a little in advance of the one at its side.

The manner of forming the coils *k* of insulated wire upon the cores or rings *j* is clearly illustrated in Fig. 3. The wire is wound in different directions on alternate sides of the said cores or rings, and its two ends *n o* are connected to the commutator-rings, as hereinafter described.

The commutator F is composed of a number of rings, *r* $r'$ $r^2$ $r^3$, a ring, E, a number of segments, *p* $p'$ $p^2$ $p^3$. The several segments *p* $p'$ $p^2$ $p^3$, which together compose a sleeve fitting upon the shaft D′ and rotating therewith, are all insulated from each other and correspond in number to the elements in the rotary generating-cylinder D. These segments are represented as having extending from them arms *q*, to which the wires *o*, leading from the elements of the generating-cylinder, are connected, the element O being connected to the segment *p*, the element O′ to the segment *p′*, the element $O^2$ to the segment $p^2$, and the element $O^3$ to the segment $p^3$.

The ring E is insulated from and secured to the aforesaid segments so as to rotate therewith, and to it the wires *n*, leading from the four elements of the generating-cylinder D, are connected.

The rings *r* $r'$ $r^2$ $r^3$ are secured upon the aforesaid segments, and are insulated from each other. Each ring is connected with one of said segments, so as to receive the electric current therefrom, and the means here shown for effecting such connection consists of pins *s*, by which the said rings are secured to the several segments. Each ring is, however, insulated from all the segments save the one to which it is connected. Thus the ring $r$ is connected by the segment $p$ with the element O, the ring $r'$ is connected by the segment $p'$ with the element O′, and so on.

It will thus be seen that the current of electricity passes from the commutator-finger $t$, bearing upon the ring E, to the several elements of the generating-cylinder D, and from said elements passes to the several rings $r$ $r'$ $r^2$ $r^3$, and thence through the commutator-fingers $w$ $w'$ $w^2$ $w^3$ away from the machine to the locality where needed.

What I claim as my invention, and desire to secure by Letters Patent, is—

1. In the generating-cylinder of a magneto-electric machine, an element consisting of the combination of a hub having projecting arms and a polygonal iron ring or core which has its sides wound with insulated wire, and which is supported by said arms, substantially as herein described.

2. As an element of the generating-cylinder of a magneto-electric machine, the combination of a hub having projecting arms, and a polygonal iron ring or core supported by said arms, and insulated wire wound upon said ring or core in reverse directions upon alternate sides thereof, substantially as herein described.

3. The generating-cylinder D, composed of the elements O O′ $O^2$ $O^3$, arranged in helical relation with the shaft D′.

4. The commutator F, composed of the rings $r$ $r'$ $r^2$ $r^3$, and connected segments $p$ $p'$ $p^2$ $p^3$, to which the coils of the generating-cylinder are separately connected, and the ring E, with which all the said coils are connected, the said rings being arranged upon the shaft of the generating-cylinder and insulated from each other, and the said segments being insulated from each other and from all the rings $r$ $r'$ $r^2$ $r^3$ except its own, and the whole being insulated from the said shaft, substantially as specified.

5. In an electro-magnetic machine, the combination, with a generating-cylinder composed of elements O O′ $O^2$ $O^3$, each element consisting of a polygonal ring or core, $j$, having its sides wound with wire, of the ring E, with which all the elements are connected, and the rings $r$ $r'$ $r^2$ $r^3$, to which the said elements are connected separately through the segments $p$ $p'$ $p^2$ $p^3$, substantially as specified.

Witnesses: EMIL BÜRGIN.

FREDK. HAYNES,

A. C. WEBB.